Feb. 26, 1929.

E. W. JACKSON 1,703,846

TRANSMISSION MECHANISM

Filed June 5, 1922

2 Sheets-Sheet 1

WITNESS:
H. Sherburne

INVENTOR.
E. W. Jackson
BY White Prost & Evans
his ATTORNEYS.

Feb. 26, 1929.  E. W. JACKSON  1,703,846
TRANSMISSION MECHANISM
Filed June 5, 1922   2 Sheets-Sheet 2

INVENTOR.
E. W. Jackson.
BY White Prost & Evans
his ATTORNEYS.

Patented Feb. 26, 1929.

1,703,846

UNITED STATES PATENT OFFICE.

ERNEST W. JACKSON, OF SAUSALITO, CALIFORNIA, ASSIGNOR TO PERFECTO GEAR DIFFERENTIAL CO., OF OAKLAND, CALIFORNIA, A CORPORATION OF WASHINGTON.

TRANSMISSION MECHANISM.

Application filed June 5, 1922. Serial No. 565,798.

My invention relates to speed change transmission mechanism, and one of the objects of the invention is the provision of a speed change transmission applicable to the drive shaft of an automobile to increase the number of speeds otherwise available. Another object of the invention is the provision of a so-called jack shaft transmission in a form substantially as compact as the planetary type of transmission mechanism.

My invention possesses other objects and features of advantage, some of which, with the foregoing will be set forth in the following description of my invention. It is to be understood that I do not limit myself to the showing made by the said description, as I may adopt variant forms of the invention within the scope of the claims.

Figure 1:
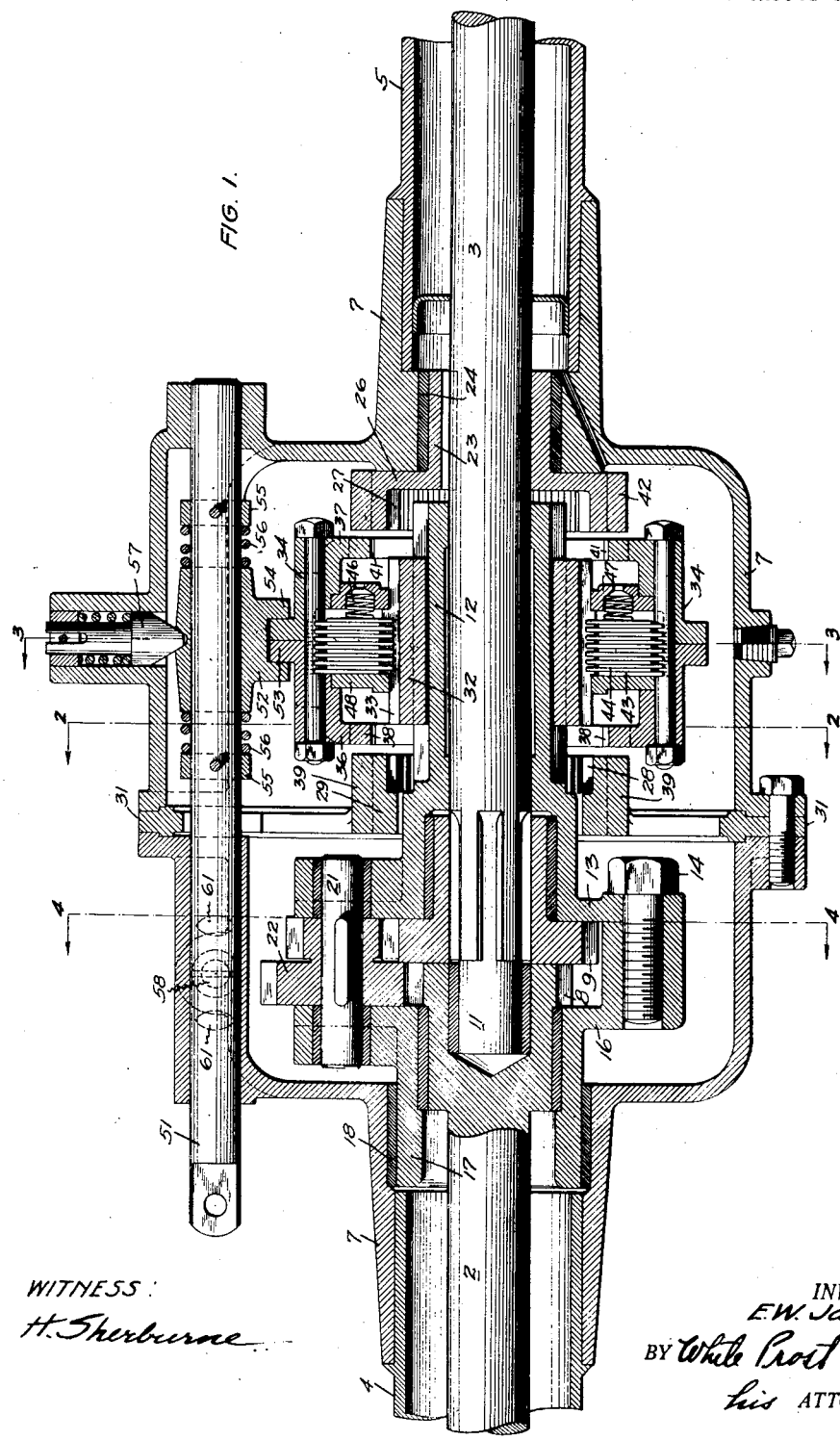
Figure 2:
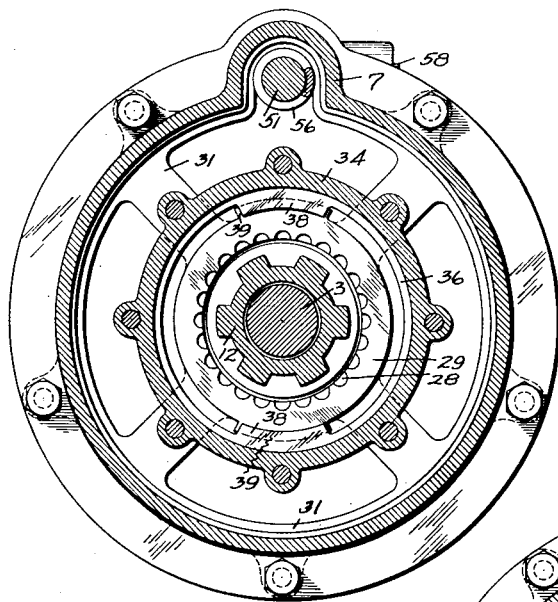
Figure 3:
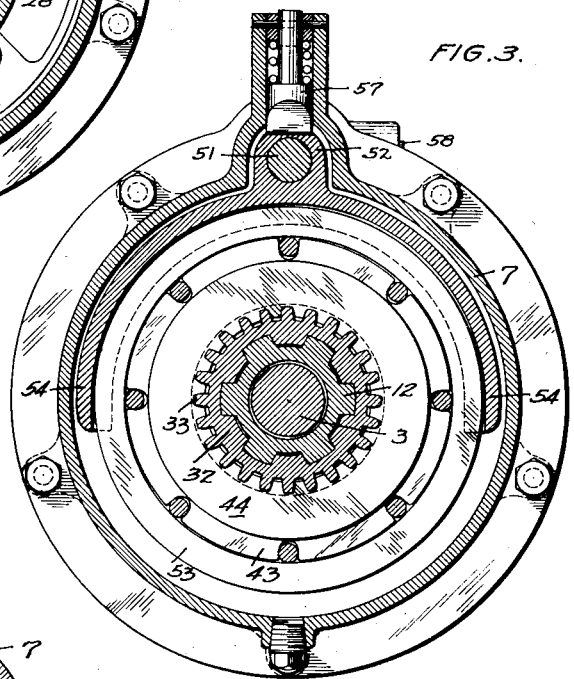
Figure 4:
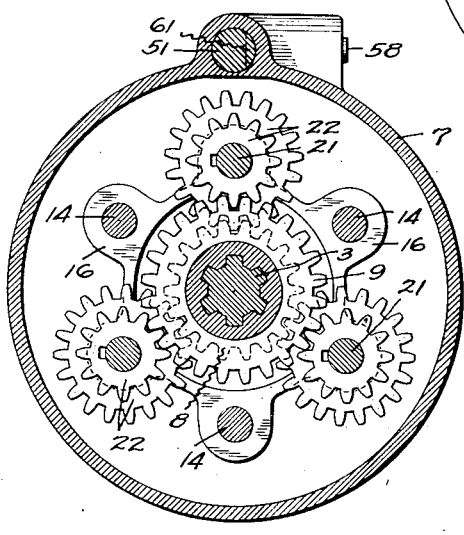

Referring to the drawings, Fig. 1 is a vertical sectional view, the plane of section passing thru the axes of the alined shafts connected by the transmission mechanism. Figs. 2, 3 and 4 are vertical sectional views, the respective planes of section being indicated in Fig. 1 by the lines 2—2, 3—3 and 4—4.

In terms of broad inclusion, my present transmission mechanism comprises an enclosing housing within which are alined driving and driven shafts about which a sleeve is mounted concentric with the axis of rotation of the shafts. Spur gears of different diameters are fixed on the ends of the shafts, and are in mesh with a double or stepped gear carried by a jack shaft mounted on the sleeve. Means are provided, optionally movable from a neutral position, in which the sleeve is rotatable relative to the shaft, to lock the sleeve to the fixed enclosing housing, or to lock it to one of the shafts. In the first case, the sleeve is held stationary and the gear connection between the shafts effects a reduction in speed between the driving shaft and the driven shaft. The sleeve is merely a mounting for the jack shaft and the range of speed which can be secured and which of course depends upon the relative sizes of the gears, is very large. This comprises a marked difference over the planetary type of transmission in which the range of speed is inherently limited by the nature of the gears. In the second case, locking the sleeve to one of the shafts effects a locking of the gears together so that relative rotation is prevented and the two shafts turn as one. When the sleeve is in neutral position, no power is transmitted to the driving axle. In order to lessen the shock resulting from the engaging of parts between which there is relative motion I provide a compound clutch the two parts of which are frictionally connected by spring-pressed friction plates. One of these parts is keyed to the sleeve and the other part is of relatively light weight so that its momentum is not too great.

The operation of the compound clutch to engage the sleeve positively with the stationary housing of the device, or with one of the shafts, first engages the lighter clutch element. With this portion of the clutch engaged, the other portion which is frictionally connected to it, is gradually brought to the speed of the light element, if the engagement is with the shaft, or gradually brought to a stop, if the engagement is with the fixed housing. When the condition of both clutch members is the same, or immediately before they are the same, continued movement of the lighter clutch member in the same direction positively engages the other clutch member without shock or strain on the parts.

A shifting bar connected to a suitable hand lever, adjacent the driver's seat, is provided for operating the clutch and a spring is interposed between the shifting bar and the clutch so that in operating the shifting bar, it may always be moved its full stroke at once, the complete engagement of the clutch being subsequently forced by the spring. The entire mechanism is placed and the parts are formed so that a lubricant works into all portions of the moving element.

More particularly, my transmission mechanism comprises a driving shaft 2, which is connected to the engine, and an alined driven shaft 3 extending rearwardly to the differential. These shafts lie respectively in the torque tube parts 4 and 5 which are connected by the fixed housing 7 enclosing the mechanism of my transmission. On the end of the driving shaft 2 is fixed a spur gear 8 and a spur gear 9 is fixed on the adjacent end of the driven shaft 3, the extreme end 11 of which is bushed in the hub of gear 8 in order to maintain perfect alinement of the shafts.

Journaled on the driven shaft 3 is a sleeve 12 provided with a flange 13 secured by screws 14 to the flange 16 of the sleeve 17 which is journaled on the hub of gear 8 and in the bushing 18 carried by the housing 7. The two sleeves 12 and 17 thus form a casing or housing around the gears 8 and 9. Journaled in suitable bosses formed on the flanges 13 and 16 are preferably three jack shafts 21, on each of which is fixed a double or stepped gear 22 in mesh with the two gears 8 and 9. The two gears 8 and 9 and the double gear parts are of different diameters in order to secure the desired speed relation between the two shafts 2 and 3 when the shaft 3 is driven thru the gearing. One of the marked advantages of my present invention lies in the fact that the sizes of these gears may be varied within wide limits to secure the desired speed relation, a flexibility not securable in the planetary type of transmission including a ring gear.

From the above it will be clear that the sleeve 17 finds its chief function in providing an outside bearing for the jack shafts 21 and an additional bearing on the housing for the main sleeve 12 of which the sleeve 17 is merely an extension. It will also be noted that the sleeve 17 provides a convenient bearing for the hub of the gear 8 and driving shaft 2.

It will be observed that if the sleeve 12 is held stationary the shaft 3 will be driven by the driving shaft 2 thru the gears 8, 22 and 9 at a speed corresponding to their diameter ratios. During such operation the transmission of power is similar to that characterizing any jack shaft arrangement, one of the distinguishing features however being the compactness of the working parts. If, however, the sleeve 12 is locked to the shaft 3, the jack shaft 21 and the double gears thereon cannot turn and the parts are locked together so that both shafts turn as one.

Means are provided for holding the sleeve 12 stationary in the housing 7, or optionally locking it for rotation with the driven shaft 3 so that the desired reduction in speed may take the place between the two shafts or the two may be driven as one.

Keyed to the shaft 3 is a collar 23 which provides a journal for the shaft in the bearing bushing 24 carried by the housing 7. A flange 26 on the collar 23 is provided with internally extending teeth 27. Similar teeth 28 are formed on the flange 29 carried by the plate 31 which is fixed transversely of the main housing 7. Splined or otherwise slidably and non-rotatably arranged on the sleeve 12 is a collar 32 on the peripheral surface of which are formed teeth 33 adapted to engage in the teeth 27, or the teeth 28, according as the collar is moved axially in one direction or the other. With the collar engaged with the teeth 27, the sleeve 12 is locked for rotation with the shaft 3. With the teeth 33 engaged with the teeth 28 the sleeve 12 is held stationary with the housing 7.

With relative movement occuring between these engageable parts, it is obvious that the sudden interlocking of the teeth would be attended by more or less shock and stress. Means are therefore provided for avoiding the sudden shock of engaging loaded members or members having high momentum, by effecting a preliminary engagement of a relatively light member frictionally connected to the collar 32 and capable of gradually bringing the rotation of the collar 32 with its connected parts to rest, or gradually picking it up to the speed at which the light part is moving so that in either case engagement of the load carrying teeth may be effected without shock or stress.

Journaled about the collar 32 and capable of relative rotary movement with respect thereto but not relative axial movement, is a housing 34 provided with internally extending flanges 36 and 37. Flange 36 is provided with two teeth or abutments 38 diametrically opposite to each other and adapted to engage two teeth 39 similarly disposed on the outside of the flange 29. The flange 37 is similarly provided with teeth 41 adapted to be engaged by the teeth 42 on the outside of the flange 26. Connection between the housing 34 and the sleeve 32, is secured by a series of friction plates 43 slidable on and arranged for rotation with the housing 34, alternated with a series of friction plates 44 similarly mounted on the collar 32. A number of coil springs 46 seated in the flange 47, for rotation with the collar 32, press the friction plates together and against the flange 48, fixed for rotation with the housing 34. The frictional resistance between the friction plates thus tends to cause the housing and the collar to rotate at the same speed or to be held stationary together, in accordance with the connection of the housing with the shaft 3 or the housing 7.

Means are provided for shifting the compound clutch comprising the housing 34 and its enclosed parts. Slidably arranged in the housing 7 is a shifting bar 51 connected by any suitable linkage with a hand lever convenient to the driver's seat.

A block 52 is slidably engaged with the annular flange 53 on the clutch by means of yoke arms 54, so that movement of the block 52 will shift the clutch in corresponding degree. Fixed to the shifting bar on each side of the block are collars 55, and coil springs 56 are interposed on each side of the block between the block and the collar.

A spring-pressed pin 57 adapted to engage in a recess in the block 52 serves to resiliently hold the clutch in neutral position, and a similar pin 58, adapted to engage recesses 61, in the shifting bar 51 resiliently holds the clutch in either of its extreme positions of complete engagement.

*Operation.*—If a direct drive between shafts 2 and 3 is desired, that is, a ratio of 1 to 1, the clutch is moved to the right of Fig. 1, the control lever being moved at once to its ultimate or extreme position in which it is held by pin 58. Movement of the shifting bar 51 first compresses one of the springs 56, which is followed by release of the block 52 and the engagement of teeth 41 and 42. With the lever in its extreme position and the housing 34 engaged, the spring 56 is under compression and will effect the complete engagement of the clutch as soon as conditions permit. The housing 34 is now traveling at the same speed as the shaft 3 and a frictional drag is being exerted to pick up the collar 32 and its connected parts. This usually occurs very quickly, and at the moment the speed of collar and housing are the same, or immediately before that point, teeth 33 and 27 are capable of engagement, which is immediately effected by pressure of the spring 56, the parts now being securely interlocked. That is to say the sleeve 12 is fixed for rotation with the shaft 3 and gears 8, 22 and 9 locked together. If a gear reduction is desired between the two shafts the clutch is moved in the opposite direction and in a similar manner the teeth 39 are first engaged with teeth 38 to bring the housing to a stop, almost immediately followed by the stopping of the collar 32 and the engagement of the teeth 33 with the teeth 28. This holds the sleeve 12 stationary and the gears 8, 22 and 9 function to drive the shaft 3 at reduced speed.

My invention is designed to be used in connection with the independent clutch mechanism already in the automobile. This clutch should be released before an attempt is made to change speed by the use of my mechanism. However, the release of the clutch in certain cars is sometimes far from complete, that is the engine may still exert a considerable pull on the driven shaft, which in turn becomes the driving shaft when considered with reference to my device. The construction of my device is such that when the independent clutch has been released and the preliminary engagement of the abutments 38 and 39, or 41 and 42, made, the drive between the preliminary or frictional, and final or positive, portions of the compound clutch tends to produce a suitable relationship of motion between that portion of the driving shaft released by the independent clutch and the portion of my device which it is sought to positively engage therewith. The control of this relationship of motion is obtained through the frictional resistance between the plates 43 and 44. As the clutch member sought to be engaged positively must be brought to a suitable state of motion within a very short time, the drag between the plates 43 and 44 must be considerable. This means that under certain conditions the drag may be sufficient to propel the car entirely through the frictional elements. This may occur when traveling on a very smooth road, or one one slightly down grade.

The fact that the car is driven by the tension between the discs 43 and 44 is not objectionable except for the excessive backlash possible between the engaged teeth. However, in my device the multitude of teeth 33 insure positive engagement of the compound clutch with either the fixed member 39 or the member 26, by action of the springs 56, at the very slightest angular variation between the parts caused either by backlash or a slippage between the frictional and positive drive portions of the compound clutch.

The effect of the above is to produce a transmisison in which a change of speed may instantly be accomplished under all circumstances, either when the car is stationary and the engine running at any possible velocity or with the engine dead and the car coasting at any possible speed, or under any combination of the above conditions.

In the usual type of jack shaft transmission shifting from a higher car speed to a lower car speed, the engine speed remaining constant is difficult. In my invention, the shift is accomplished by disengaging a member which is revolving in engine direction and locking same to a stationary member. The disengaged member tends, when released, to revolve opposite to engine direction, but it must first come to a state of rest, which greatly facilitates its engagement with a member which is already at rest. This condition is opposite in action to that prevailing in the usual type of jack shaft transmission. The usual ease of shifting from a slower to a higher car speed is enhanced in my device.

I claim:

1. The combination with a shaft, a sleeve and a fixed element, of clutch mechanism for optionally locking the sleeve for rotation with said shaft or to said fixed element comprising a collar slidably arranged on said sleeve for rotation therewith and engageable with said fixed element and with said shaft, a housing rotatably and slidably arranged on said sleeve and engageable with said fixed element and with said shaft, friction plates alternately fixed for rotation with said collar and housing; a shifting bar connected to said housing for moving said housing, and a spring for yieldingly resisting movement of said bar.

2. The combination with a shaft, a sleeve and a fixed element, of clutch mechanism for optionally locking the sleeve for rotation with said shaft or to said fixed element comprising a collar slidably arranged on said sleeve for rotation therewith and engageable with said fixed element and with said shaft, a housing rotatably and slidably arranged on said sleeve and engageable with said fixed element and with said shaft, a series of friction plates carried on and fixed for rotation with said housing, a series of friction plates carried on and fixed for rotation with said collar and alternated with said housing plates, springs for pressing said plates together, and means for shifting said housing to engage first the housing and then the collar with said fixed element or said shaft.

3. In combination, a sleeve, a fixed element, a shaft rotatable independently of said sleeve, a collar slidably arranged on said sleeve for rotation therewith and engageable with said fixed element and with said shaft, a housing rotatably and slidably arranged on said sleeve and engageable with said fixed element and with said shaft, spring-pressed friction plates interposed between said collar and housing, and means for shifting said housing to engage first the housing and then the collar with said fixed element or said shaft.

4. A transmission mechanism comprising a driving and a driven shaft, a sleeve loose on the driven shaft, a gear system arranged on said shafts and sleeve for connecting the shafts, a fixed element, a collar fixed on said driven shaft, a collar slidably arranged on said sleeve for rotation therewith and engageable with said fixed element and with said shaft collar, a housing loose on said sleeve and slidable thereon with said sleeve collar and engageable with said fixed element and said shaft collar before engagement therewith of said sleeve collar, spring-pressed friction plates interposed between said sleeve collar and housing, and means for shifting said housing to engage first the housing and then the sleeve collar with said fixed element or said shaft collar.

5. A transmission mechanism comprising a driving and a driven shaft, a sleeve loose on the driven shaft, a gear system arranged on said shafts and sleeve for connecting the shafts, a fixed element, a collar fixed on said driven shaft, a collar slidably arranged on said sleeve for rotation therewith and engageable with said fixed element and with said shaft collar, a housing loose on said sleeve and slidable thereon with said sleeve collar and engageable with said fixed element and said shaft collar before engagement therewith of said sleeve collar, spring-pressed friction plates interposed between said sleeve collar and housing, a bar for shifting said housing and a spring interposed between said bar and said housing.

6. In a device of the character described, means for axially shifting a clutch comprising an auxilairy movable block connected with said clutch for movement therewith, a shifting bar axially slidably arranged relative to said block, and a spring interposed between said bar and block.

7. In a device of the character described, means for axially shifting a clutch comprising an auxiliary movable block connected with said clutch for movement therewith, a shifting bar axially slidably arranged relative to said block, a spring interposed between said bar and block and a spring-pressed pin for holding said block in a given position.

8. A shifting device comprising a block operatively connected to an element to be shifted, a longitudinally movable shifting bar on which said block is slidably arranged, a spring interposed between said block and bar, and a spring-pressed pin for holding said block in position.

9. A shifting bar comprising a block operatively connected to an element to be shifted, and provided with a recess therein, a shifting bar slidably arranged relative to said block, a collar on said bar spaced from said block, a spring interposed between said collar and said block, and a spring-pressed wedge-shaped pin engaged in said recess.

10. A shifting device comprising a block opertively connected to an element to be shifted and provided with a recess therein, a shifting bar slidably arranged relative to said block, a collar on said bar spaced from said block, a spring interposed between said collar and said block, and means engaging in said recess for resiliently retaining said block in position.

11. The combination with a shaft, a sleeve and a fixed element; of clutch mechanism for optionally locking the sleeve for rotation with said shaft or to said fixed element, comprising a collar slidably arranged on said sleeve for rotation therewith and engageable with said fixed element and with said shaft, means rotatably and slidabiy arranged on said sleeve and engageable with said fixed element and with said shaft, friction means interposed between said collar and said rotatable and slidable means, and means for shifting said rotatable and slidable means to engage first the rotatable and slidable means and then the collar with the fixed element or with the shaft.

In testimony whereof, I have hereunto set my hand.

ERNEST W. JACKSON.